US008459177B2

(12) United States Patent
Magg et al.

(10) Patent No.: US 8,459,177 B2
(45) Date of Patent: Jun. 11, 2013

(54) COFFEE MACHINE COMPRISING A HEIGHT-ADJUSTABLE SPOUT

(75) Inventors: Johann Magg, St. Georgen (DE); Andreas Mayr, Breitbrunn am Chiemsee (DE); Markus Obermaier, Nußdorf (DE)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 1489 days.

(21) Appl. No.: 10/587,162

(22) PCT Filed: Jan. 26, 2005

(86) PCT No.: PCT/EP2005/050325
§ 371 (c)(1),
(2), (4) Date: Apr. 12, 2007

(87) PCT Pub. No.: WO2005/072583
PCT Pub. Date: Aug. 11, 2005

(65) Prior Publication Data
US 2007/0193450 A1    Aug. 23, 2007

(30) Foreign Application Priority Data
Jan. 30, 2004  (DE) .......................... 10 2004 004 820

(51) Int. Cl.
*A47J 31/44* (2006.01)
(52) U.S. Cl.
USPC .............................. 99/284; 99/302 R; 99/307

(58) Field of Classification Search
USPC ................................ 99/284, 302 R, 307, 295
See application file for complete search history.

(56) References Cited

U.S. PATENT DOCUMENTS

| | | | | |
|---|---|---|---|---|
| 5,255,413 A | * | 10/1993 | Sabo | 16/417 |
| 5,992,298 A | | 11/1999 | Illy et al. | |
| 6,009,792 A | * | 1/2000 | Kraan | 99/295 |
| 6,021,706 A | * | 2/2000 | Seguenot et al. | 99/319 |
| 7,503,254 B2 | * | 3/2009 | Noordhuis | 99/295 |
| 2005/0005774 A1 | | 1/2005 | Fulgoni et al. | |

FOREIGN PATENT DOCUMENTS

| | | | |
|---|---|---|---|
| CH | 636 254 | | 5/1983 |
| DE | 80 23 472 | | 2/1982 |
| DE | 3602665 | * | 8/1987 |
| DE | 37 42 930 | | 10/1988 |
| DE | 298 10 291 | | 9/1998 |
| EP | 1 199 016 | | 4/2002 |
| FR | 2 489 130 | | 4/1982 |
| WO | WO 02/38016 | | 5/2002 |

* cited by examiner

*Primary Examiner* — Reginald L Alexander
(74) *Attorney, Agent, or Firm* — James E. Howard; Andre Pallapies

(57) ABSTRACT

A coffee machine, especially an espresso machine, comprising a brew chamber provided with at least one coffee outlet, a height-adjustable spout for ejecting coffee, and an impact surface arranged upstream of said spout. The aim of the invention is to ensure that, despite the fact that the height of the spout can be adjusted, the coffee produced is of a consistently high quality. To this end, the impact surface is arranged at a fixed distance from the coffee outlet, coffee passing through said outlet hitting the impact surface and being guided to the spout from the impact surface.

24 Claims, 6 Drawing Sheets

COFFEE MACHINE COMPRISING A HEIGHT-ADJUSTABLE SPOUT

The invention relates to a coffee machine.

Coffee machines in the prior art operate according to different principles. The most common models are the so-called pressureless coffee machines. In these water flows from a storage container into an electrically heatable pipe. Particularly as a result of the evolution of steam in this pipe, heated water is then pushed through a riser to an outlet via which the heated water then drips into a coffee filter. The filter coffee can then flow from this coffee filter at atmospheric pressure into a pot.

In contrast, in espresso machines an elevated pressure prevails in the area of the coffee grounds, for example 15 bar. This is achieved by supplying water from a water container or another water supply to an electric-motor-driven pump which then supplies the water at high pressure via an electrically heatable area to a coffee grounds receiving device. This coffee grounds receiving device generally comprises a filter for receiving the coffee. In order to generate the high pressure in the coffee area, during operation the coffee grounds receiving device is located in an area which is sealed towards the atmosphere, which can be designated as a pressure chamber or brewing chamber.

In another coffee machine which operates on a different principle, it is provided to first transfer the water for preparing the coffee from a water container into a heatable intermediate container. From this intermediate container the heated water is passed to an electric-motor-driven pump from which it is supplied at elevated pressure, for example 2 to 3 bar, to a coffee grounds receiving device. In this case, it is provided that unlike in the espresso machine the coffee is not introduced into the coffee grounds receiving device in loose form as coffee grounds but is inserted in a retainer in the form of a coffee pad, that is, in compacted form surrounded by filter paper. The retainer with a retainer cover via which water is supplied can form a sealed pressure chamber. At the same time, the retainer for the coffee pads is allocated a plurality of functions. Firstly, the retainer provides a sealing surface so that a pressure chamber can be formed. Moreover, the retainer has an outlet opening from which the coffee can emerge. Furthermore, the coffee pad should be mounted in the retainer in a manner such that flow through the coffee pad is not impeded. Such a coffee machine occupies an intermediate position between a conventional pressureless coffee machine and an espresso machine.

In espresso machines and those coffee machines which prepare coffee on the basis of coffee pads, the coffee is generally passed directly via a spout into a cup. In this case, care should be taken to ensure that the distance between the spout and an area for placing the cups is large enough to provide the possibility of placing large cups under the spout. On the other hand, the distance should not be selected as too large for the removal of coffee with a small cup so that the coffee enters the cup as unerringly as possible and with the lowest possible loss of temperature. In order to satisfy these contradictory requirements, it has already been proposed, for example, in DE 298 10 291 U to provide a height-adjustable spout. In particular, when high demands are imposed on the quality of the coffee, however, problems also arise with height-adjustable spout devices since the coffee must cover different path lengths depending on the adjustment of the spout.

It is the object of the invention to provide a coffee machine with a height-adjustable spout which ensures a uniformly high quality of the coffee.

This object is achieved with the features of the independent claim.

Advantageous embodiments of the invention are given in the dependent claims.

The invention builds on the generic coffee machine in that the impact surface is arranged at a fixed distance from the coffee outlet, coffee passing through said outlet hitting the impact surface and being guided to the spout. In particular, in coffee machines which prepare coffee at high pressure in a brewing chamber and wherein this coffee emerges from a small coffee outlet to form froth, the distance between the coffee outlet and the impact surface has a major influence on the coffee quality. If this distance is kept constant but nevertheless a height-adjustable spout is provided, it is possible to satisfy both the requirements for high coffee quality and also provide the possibility for filling cups of different height with an optimal distance from the spout.

It is usefully provided that the spout comprises at least one spout support disposed in a guide which is vertically displaceable in said guide. This is a constructively simple but nevertheless effective possibility for adjusting the height of the spout. Such a spout support disposed in a guide can also be telescopic to continue this principle.

It can be useful to provide the spout support with a handle for adjustment of its height. It is therefore not necessary to touch the spout support itself by hand, this support sometimes being hot or dirty.

At the same time, it can be provided that the handle is provided at an end of the spout support on the discharge side. Such an attachment of the handle can be appropriate depending on the design of the spout, the guide and the spout support.

However, if the design of said components is different, it can also be useful to provide the handle at an end of the spout support on the discharge side.

It can also be preferable if the handle is connected to the spout support by means of an opening on the guide. This provides a large clearance and defined limits for the displacement for given dimensions of the guide and spout support.

It is preferable if the opening is constructed as a vertical slot in which the handle connected to the spout support can be displaced upwards and downwards. The movement clearance provided by a vertical slot corresponds to the desired upward and downward movement to be executed by the spout support.

It is furthermore preferable to provide two spout supports, these being jointly adjustable in height by means of a single handle. In this way, two coffee cups can be filled simultaneously.

It is usefully provided that the handle is arranged between the two spout supports. It is thereby clear to the user of the coffee machine on an intuitive level that the handle is allocated to the two spout supports.

However, it can also be useful if the spout supports arranged in the guide can be displaced vertically independently of one another. This provides the possibility of filling one small cup and one large cup with coffee at the same time, for example, if an espresso and a cappuccino are to be prepared simultaneously.

This can be achieved such that the guide has two slots in which respectively one handle connected to a spout support can be displaced independently upwards and downwards. Even when the spout supports are adjusted independently, this can ensure that no scalding occurs.

It can usefully be provided that the spout support is telescopic. A further degree of freedom in the height adjustment of the spout support can hereby be provided.

The invention is based on the finding that a uniformly high coffee quality can be ensured as a result of the constant distance between the impact surface and the coffee outlet despite the height-adjustable spout.

The invention is now explained in detail with reference to the accompanying drawings using particularly preferred embodiments. In the figures.

In the following description of the drawings the same reference numerals denote the same or comparable components.

Figure 1:
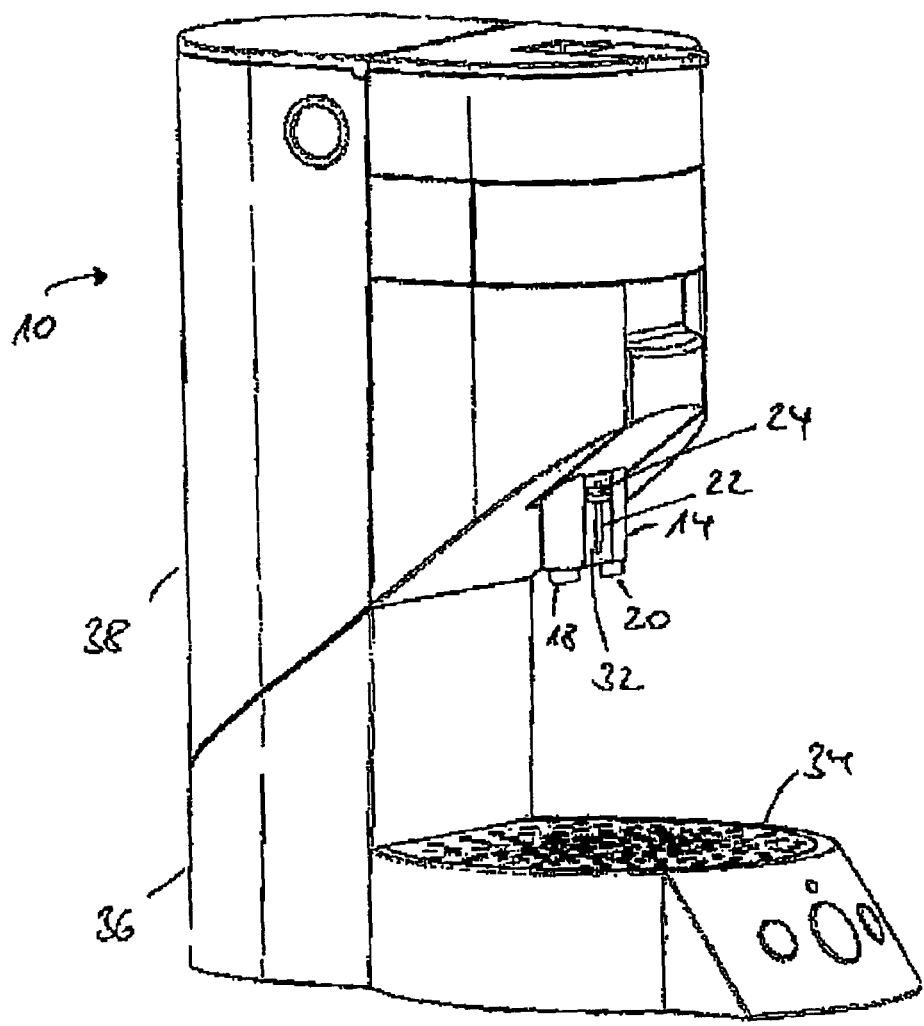
FIG. 1 is a perspective view of a coffee machine according to the invention in a first state.
Figure 2:
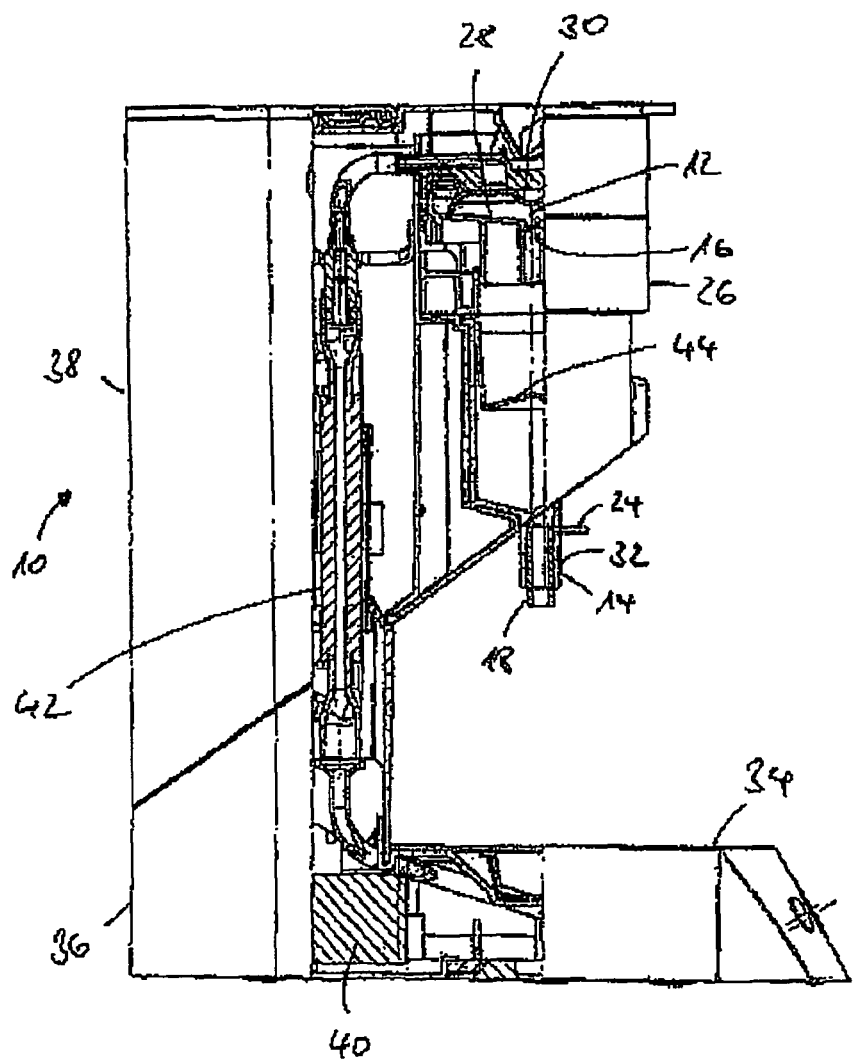
FIG. 2 is a sectional view of the coffee machine according to FIG. 1 in the first state.

FIG. 1 shows a perspective view of a coffee machine in a first state. FIG. 2 shows a sectional view of the coffee machine from FIG. 1 in the first state. The coffee machine 10 comprises a water container 38 which is placed on a rear columnar assembly 36. Water is removed from this water container 38 by electrical actuation of a pump 40. The water is supplied to a continuous flow heater 42 before entering into the brewing chamber 12 from above through the upper portion of the brewing chamber 30. The brewing chamber 12 is formed by a coffee pad holder 28 and a brewing chamber upper portion 30. The coffee pad retainer 28 can be inserted in the coffee machine 10 by means of a drawer 26. A coffee outlet 16 is provided in the coffee pad retainer 28 via which coffee emerges at high pressure to form froth and then hits an impact surface 44. This impact surface 44 is at a constant distance from the coffee outlet 16. From the impact surface 44 the coffee then passes to a spout 14. This spout 14 comprises a guide 32 and spout supports 18, 20 disposed in the guide 32. These spout supports 18, 20 are adjustable in height by means of a handle or a slider 24 which slides in an opening or a slot 22 of the guide 32. Consequently, the distance between the emergence of the coffee from the spout 14 and a cup placed on the front portion 34 of the coffee machine 10 can be varied whilst the distance between the impact surface 44 and the coffee outlet 16 remains constant.

Figure 5:
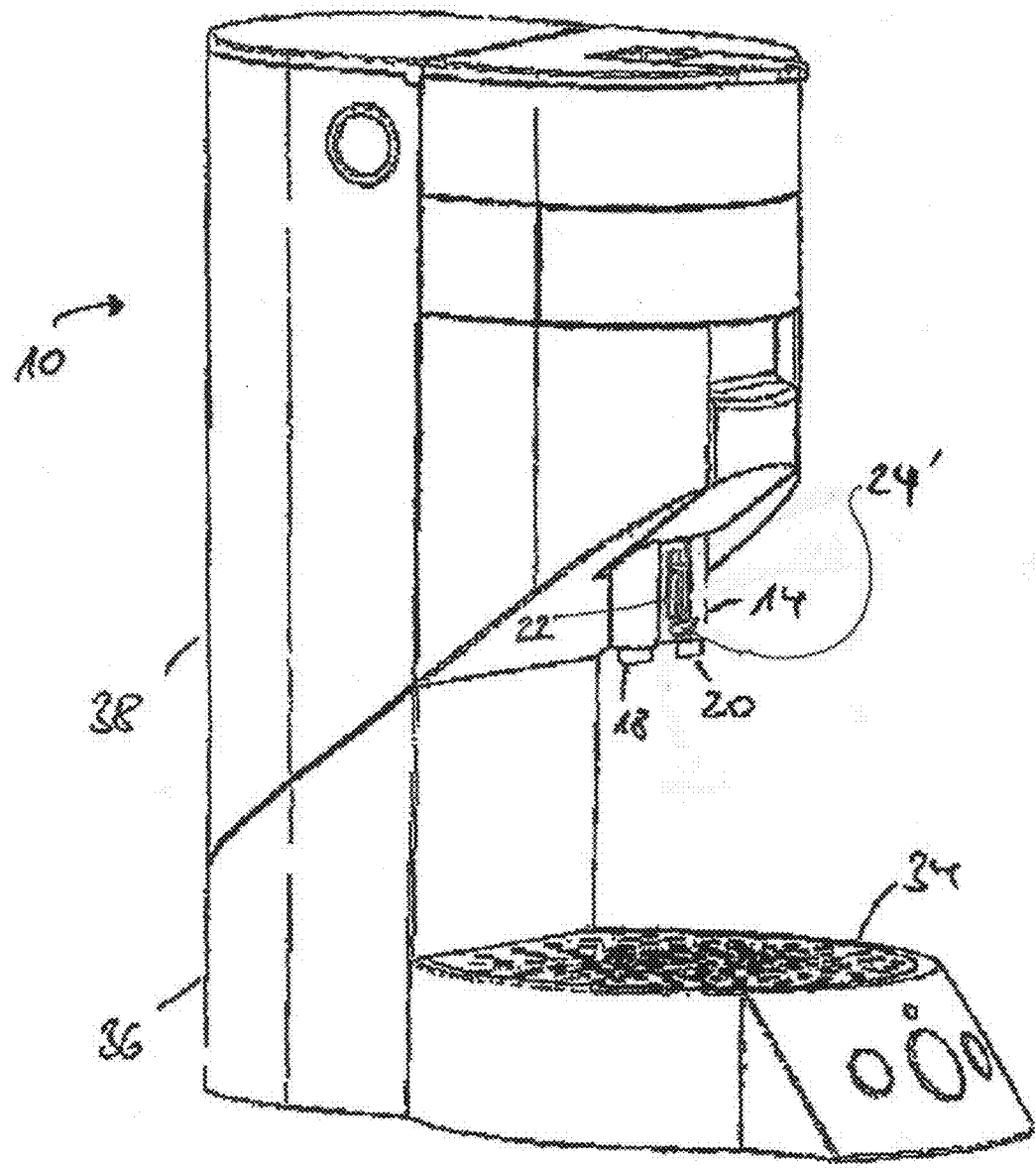
FIG. 5 is a perspective view of a coffee machine according to an alternate embodiment of the invention.

In the embodiment shown the slider 24 is provided at the end on the inflow side between the two spout supports 18, 20. It is likewise possible to arrange the slider at the end of the spout supports 18, 20 on the discharge side, as shown as 24' in FIG. 5.

Figure 3:
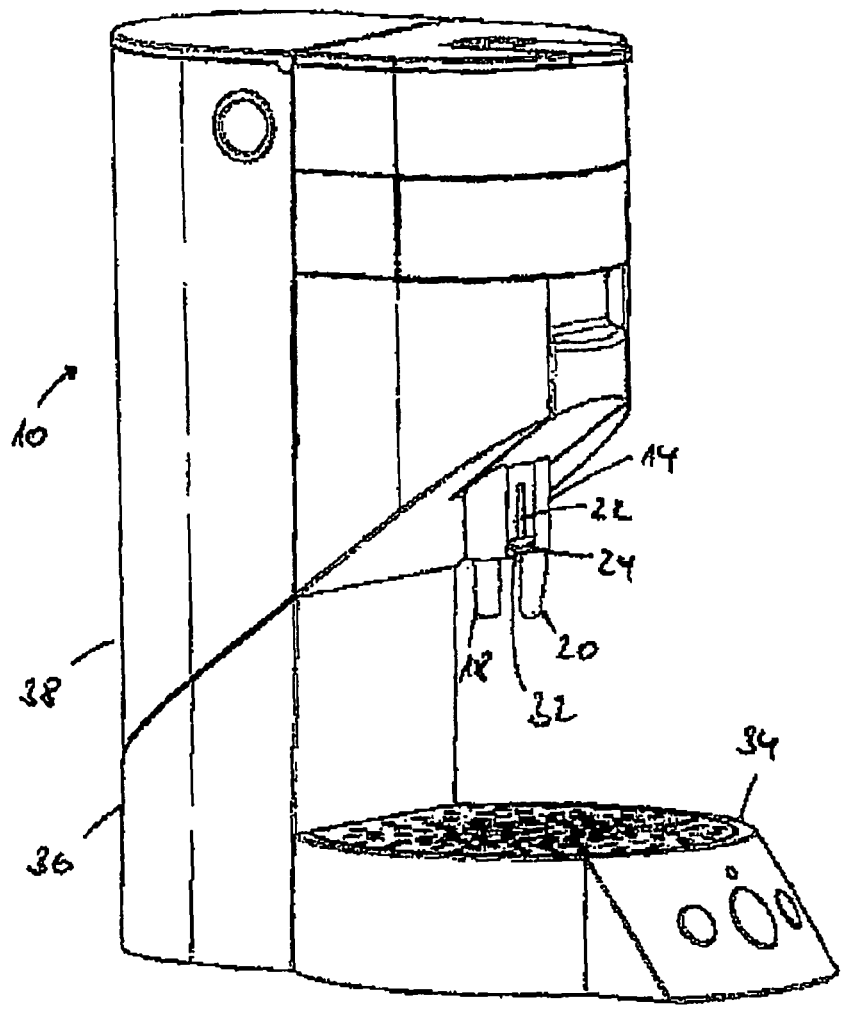
FIG. 3 is a perspective view of a coffee machine according to the invention in a second state.
Figure 4:
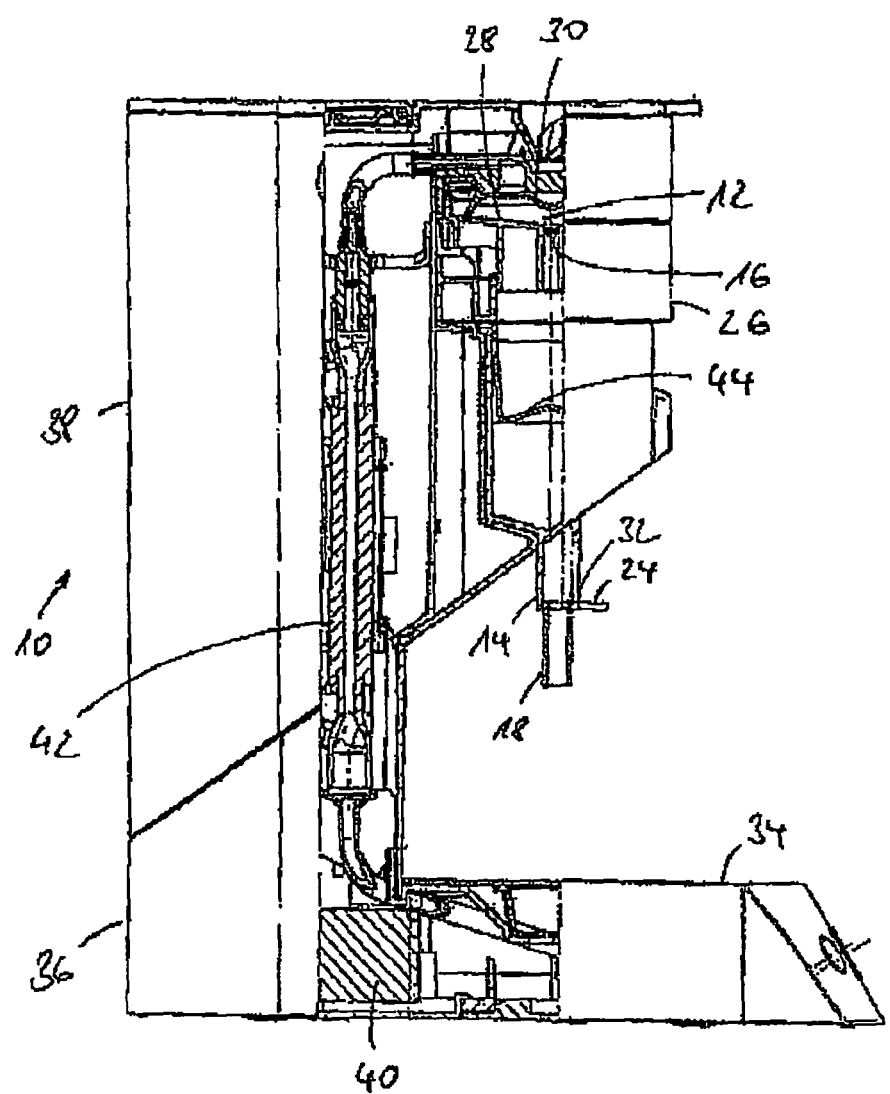
FIG. 4 shows a sectional view of the coffee machine according FIG. 3 in the second state.

FIG. 3 shows a perspective view of a coffee machine according to the invention in a second state. FIG. 4 shows a sectional view of the coffee machine according to FIG. 3 in the second state. Here the spout is shown in a position at a short distance between the front portion 34 and the ends of the spout supports 18, 20.

Figure 6:
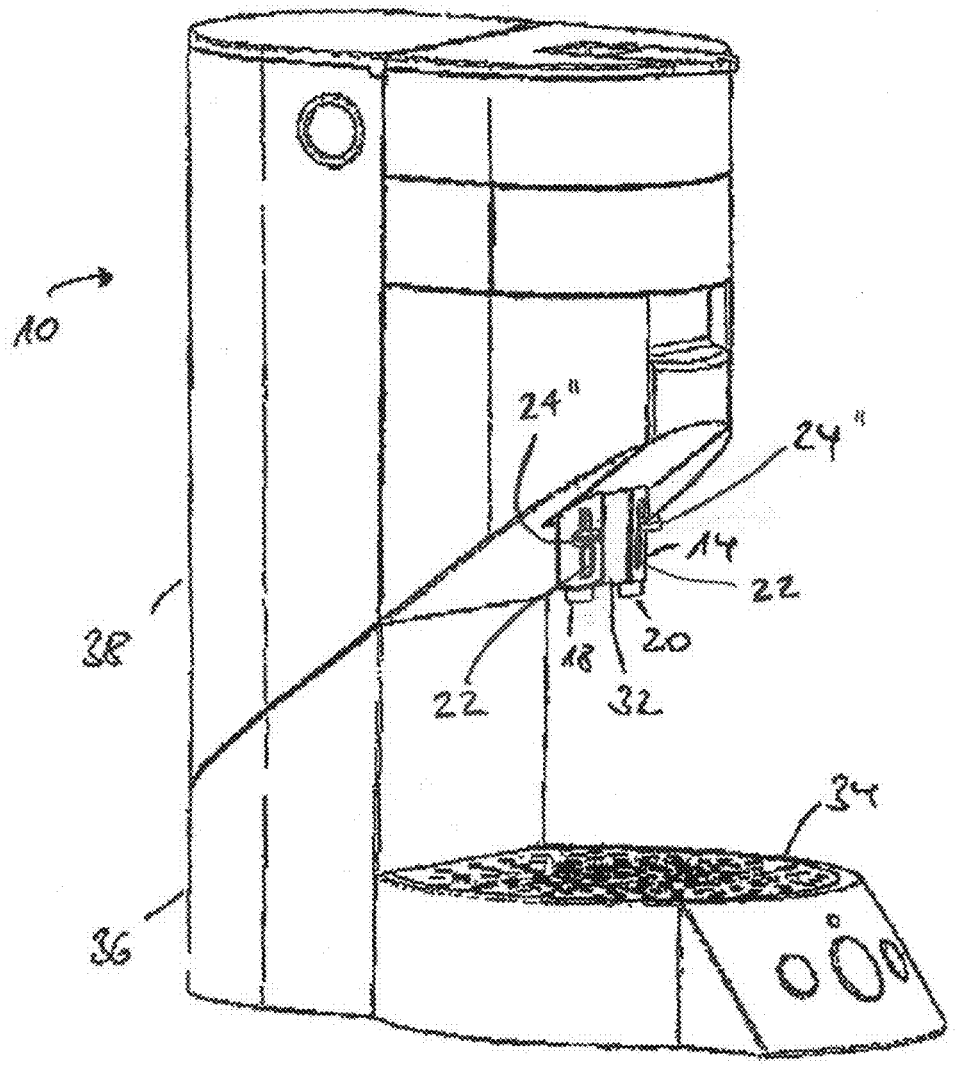
FIG. 6 is a perspective view of a coffee machine according to an alternate embodiment of the invention.

It can be useful if the spout supports arranged in the guide can be displaced vertically independently of one another as shown in FIG. 6. Two slides 24" can be provided (each in its own slot 22) to allow the spout supports to be displaced vertically independently of one another. This provides the possibility of filling one small cup and one large cup with coffee at the same time, for example, if an espresso and a cappuccino are to be prepared simultaneously.

The features of the invention disclosed in the preceding description, in the drawings and in the claims can be important for carrying out the invention both individually and also in any combination.

REFERENCE LIST

10 Coffee machine
12 Brewing chamber
14 Spout
16 Coffee outlet
18 Spout support
20 Spout support
22 Opening, slot
24 Handle, slider
26 Drawer
28 Coffee pad retainer
30 Brewing chamber upper portion
32 Guide
34 Front portion
36 Rear assembly
38 Water container
40 Pump
42 Continuous flow heater
44 Impact surface

The invention claimed is:

1. A coffee machine comprising a brewing chamber provided with at least one outlet for coffee and a spout which is height-adjustable relative to the outlet and is for ejecting coffee, and an impact surface arranged upstream thereof,
   wherein the impact surface is arranged at a fixed distance from the coffee outlet,
   coffee emerging from the coffee outlet hits the impact surface,
   the coffee is passed to the spout from the impact surface, and
   the spout comprises at least one spout support disposed in a guide which is vertically displaceable in said guide.

2. The coffee machine according to claim 1, wherein the spout support is provided with a handle for adjustment of its height.

3. The coffee machine according to claim 2, wherein the handle is provided at an end of the spout support on the discharge side.

4. The coffee machine according to claim 2, wherein the handle is provided at an end of the spout support on the inflow side.

5. The coffee machine according to claim 2, wherein the handle is connected to the spout support by means of an opening on the guide.

6. The coffee machine according to claim 5, wherein the opening is constructed as a vertical slot in which the handle connected to the spout support can be displaced upwards and downwards.

7. The coffee machine according to claim 2, wherein two spout supports are provided, these being jointly adjustable in height by means of a single handle.

8. The coffee machine according to claim 7, wherein the handle is arranged between the two spout supports.

9. The coffee machine according to claim 2, wherein the spout supports arranged in the guide can be displaced vertically independently of one another.

10. The coffee machine according to claim 9, wherein the guide has two slots in which respectively one handle connected to a spout support can be displaced independently upwards and downwards.

11. The coffee machine according to claim 1, wherein the spout supports are telescopic.

12. The coffee machine according to claim 1, wherein the coffee machine includes an espresso machine having a pressurized brewing chamber.

13. A coffee machine for dispensing coffee to a coffee receptacle, the coffee machine comprising:
- a brewing chamber, the brewing chamber having an outlet for the discharge of coffee from the brewing chamber;
- an impact surface located downstream from the outlet and at a fixed distance from the outlet; and
- a spout for discharging the coffee from the coffee machine, the spout having a discharge end from which the coffee is discharged from the coffee machine, the discharge end being located downstream from the impact surface, the spout being adjustable to adjust a vertical distance from the impact surface to the discharge end, and the spout being adjustable to adjust a vertical distance from the discharge end to a platform on which the coffee receptacle is to be placed,
- wherein the impact surface is positioned vertically below the outlet to provide a surface which coffee discharged from the outlet will hit before entering the spout, and
- the spout comprises at least one outlet stub pipe disposed in a guide, the outlet stub pipe being vertically displaceable within the guide and having the discharge end at its lower end.

14. The coffee machine according to claim 13, wherein the outlet stub pipe is provided with a handle for vertical adjustment.

15. The coffee machine according to claim 14, wherein the handle is provided at the discharge end of the outlet stub pipe.

16. The coffee machine according to claim 14, wherein the handle is provided at an end of the outlet stub pipe opposite the discharge end.

17. The coffee machine according to claim 14, wherein the handle is connected to the outlet stub pipe through an opening on the guide.

18. The coffee machine according to claim 17, wherein the opening on the guide is a vertical slot in which the handle can be displaced vertically.

19. The coffee machine according to claim 14, wherein two outlet stub pipes are provided and the handle is a single handle, the outlet stub pipes being jointly vertically adjustable by the single handle.

20. The coffee machine according to claim 19, wherein the single handle is arranged between the two outlet stub pipes.

21. The coffee machine according to claim 14, wherein two outlet stub pipes are provided and two handles are provided, the outlet stub pipes being vertically adjustable independently of one another.

22. The coffee machine according to claim 21, wherein the guide has two vertical slots, each handle being connected to one of the outlet stub pipes through one of the vertical slots.

23. The coffee machine according to claim 13, wherein the outlet stub pipe telescopes within the guide.

24. The coffee machine according to claim 13, wherein the coffee machine has a pressurized brewing chamber.

* * * * *

UNITED STATES PATENT AND TRADEMARK OFFICE
CERTIFICATE OF CORRECTION

PATENT NO. : 8,459,177 B2  Page 1 of 1
APPLICATION NO. : 10/587162
DATED : June 11, 2013
INVENTOR(S) : Magg et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1217 days.

Signed and Sealed this
Eighth Day of September, 2015

Michelle K. Lee
*Director of the United States Patent and Trademark Office*